United States Patent
Nikolovski (10) Patent No.: US 9,921,087 B2
(45) Date of Patent: Mar. 20, 2018

(54) SYSTEM AND METHOD FOR MEASURING A FLUID FLOW RATE BY PROVOKING DESTRUCTIVE INTERFERENCES BETWEEN ACOUSTIC WAVES PROPAGATING IN OPPOSITE DIRECTIONS WITH RESPECT TO THE FLOW OF THE FLUID

(71) Applicant: Commissariat a L'Energie Atomique et aux Energies Alternatives, Paris (FR)

(72) Inventor: Jean-Pierre Nikolovski, Carry-le-Rouet (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 15/134,596

(22) Filed: Apr. 21, 2016

(65) Prior Publication Data
US 2016/0313157 A1    Oct. 27, 2016

(30) Foreign Application Priority Data
Apr. 21, 2015  (FR) ...................... 15 53550

(51) Int. Cl.
*G01F 1/66* (2006.01)
*G01K 11/24* (2006.01)
(Continued)

(52) U.S. Cl.
CPC ............... *G01F 1/66* (2013.01); *G01F 1/662* (2013.01); *G01F 1/667* (2013.01); *G01F 15/02* (2013.01); *G01K 11/24* (2013.01); *G01K 13/02* (2013.01)

(58) Field of Classification Search
None
See application file for complete search history.

(56) References Cited

U.S. PATENT DOCUMENTS

| 4,481,517 A | 11/1984 | Brown |
| 5,001,936 A | 3/1991 | Baumoel |

(Continued)

FOREIGN PATENT DOCUMENTS

| DE | 42 41 225 A1 | 6/1994 |
| GB | 2 472 087 A | 1/2011 |

(Continued)

OTHER PUBLICATIONS

French Preliminary Search Report dated Apr. 4, 2016 in French Application 15 53550, filed Apr. 21, 2015 (with English Translation of Categories of Cited Documents and Written Opinion).

*Primary Examiner* — Harshad R Patel
(74) *Attorney, Agent, or Firm* — Oblon, McClelland, Maier & Neustadt, L.L.P.

(57) ABSTRACT

This system for measuring a flow rate includes a receiver of bulk acoustic waves, a first emitter of bulk acoustic waves in the fluid, intended to be arranged upstream of the receiver in such a way as to emit acoustic waves to the receiver, a second emitter of bulk acoustic waves in the fluid, intended to be arranged downstream of the receiver in such a way as to emit acoustic waves to the receiver, and a signal processing device designed to determine a flow rate value according to at least one characteristic of an electrical signal supplied by the receiver. It further includes an element for synchronizing the first and second emitters with each other in such a way as to generate destructive acoustic interferences between the acoustic waves that they emit before they are received by the receiver.

10 Claims, 2 Drawing Sheets

(51) Int. Cl.
*G01F 15/02* (2006.01)
*G01K 13/02* (2006.01)

(56) References Cited

U.S. PATENT DOCUMENTS

| | | | |
|---|---|---|---|
| 5,040,415 A | 8/1991 | Barkhoudarian | |
| 6,696,843 B1 * | 2/2004 | Beneteau | G01F 1/667 |
| | | | 73/861.25 |
| 7,093,502 B2 * | 8/2006 | Kupnik | G01F 1/662 |
| | | | 73/861.27 |
| 7,152,490 B1 * | 12/2006 | Freund, Jr. | G01F 1/667 |
| | | | 73/861.27 |
| 7,823,463 B1 * | 11/2010 | Feller | G01F 1/662 |
| | | | 73/861.27 |
| 7,895,903 B2 * | 3/2011 | Bailey | G01F 1/666 |
| | | | 73/861.25 |
| 7,963,176 B2 * | 6/2011 | Pors | G01F 1/662 |
| | | | 73/861.25 |
| 2009/0025487 A1 * | 1/2009 | Gysling | G01F 1/662 |
| | | | 73/861.25 |
| 2010/0192703 A1 * | 8/2010 | Huang | G01F 1/66 |
| | | | 73/861.28 |
| 2010/0313676 A1 * | 12/2010 | Straub, Jr. | G01F 1/667 |
| | | | 73/861.28 |
| 2011/0094309 A1 * | 4/2011 | Berger | G01F 1/662 |
| | | | 73/861.28 |
| 2012/0265454 A1 | 10/2012 | Rudd et al. | |
| 2014/0260668 A1 * | 9/2014 | Liu | G01F 1/66 |
| | | | 73/861.28 |
| 2015/0211905 A1 | 7/2015 | Drachmann | |
| 2015/0219482 A1 | 8/2015 | Drachmann | |

FOREIGN PATENT DOCUMENTS

| | | |
|---|---|---|
| WO | WO 93/04343 A1 | 3/1993 |
| WO | WO 2008/053193 A1 | 5/2008 |
| WO | WO 2014/029404 A1 | 2/2014 |

* cited by examiner

SYSTEM AND METHOD FOR MEASURING A FLUID FLOW RATE BY PROVOKING DESTRUCTIVE INTERFERENCES BETWEEN ACOUSTIC WAVES PROPAGATING IN OPPOSITE DIRECTIONS WITH RESPECT TO THE FLOW OF THE FLUID

BACKGROUND OF THE INVENTION

This invention relates to a system for measuring a fluid flow rate by processing of acoustic waves propagating in this fluid. It also relates to a method implemented by this system.

Such a system can be considered in particular for the detecting of leaks in a duct.

It is generally an ultrasound technology that is implemented, i.e. a technology implementing the propagation of acoustic waves greater than 20 kHz, with the ultrasounds propagating particularly well in elastic mediums such as liquids or gases. Measuring the flow rate using ultrasound implements emitting and receiving probes, with the two able to be one in the same.

DESCRIPTION OF THE PRIOR ART

According to a known first technique for processing signals, an ultrasonic flowmeter makes use of the Doppler effect according to which the frequency variation of an ultrasonic signal reflected by a particle of the fluid is directly linked to the flow velocity of the fluid. This first technique only requires a minimum of a single emitting and receiving probe. On the other hand, it requires a complex emission/reception protocol and corresponding processing that is also complex in order to retrieve the flow rate information. This results in a high manufacturing cost and energy consumption.

According to a known second technique for processing signals, an ultrasonic flowmeter makes use of different transit times of ultrasonic waves according to whether they propagate in the direction or against the direction of flow of the fluid. The difference in the upstream/downstream and downstream/upstream transit times is characteristic of an average velocity of the fluid. This second technique requires at least two emitting and receiving probes, one being arranged downstream, the other upstream, as for example detailed in patent FR 2 901 612 B1. Moreover, the velocity measured as such is the average velocity along a predetermined path, direct or with reflection(s), between the two probes. Each probe is alternately sending and receiving an ultrasonic pulse wave directed towards the other probe, with the whole constituting, with the predetermined path, a measuring rope. According to this second technique, it is often required to have several measuring ropes, and therefore several different pairs of emitting and receiving probes, in order to retrieve the flow rate information. Furthermore, as the measurement is taken by differential transit time between ultrasonic pulses, the timing precision requirement for measurements is constraining and the probes used must be with a strongly damped pulse response. This therefore also results in a high manufacturing cost and energy consumption.

These high manufacturing costs and these high consumptions of the known ultrasonic flowmeters do not allow for their generalized use for detecting leaks in drinking water distribution network pipes for example. Consequently, such flowmeters are most often installed at the output of a treatment plant and at the input of the network of the customers, but very rarely within the intermediate transmission network itself, which is generally buried. Searching for and locating leaks is thus a laborious and costly process, to such a point that it is considered that more than 30% of the drinking water distributed is lost by the absence of systematic research of underground leaks. If the cost of a system for measuring a fluid flow rate by processing of acoustic waves were more affordable, it is certain that the quality of the water distribution services would be improved and the rate of leaks substantially reduced.

It can thus be desired to provide a system for measuring a fluid flow rate by processing of acoustic waves that makes it possible to overcome at least part of the aforementioned problems and constraints, in particular which is simple in terms of signal processing and inexpensive to manufacture or in terms of energy consumption.

SUMMARY OF THE INVENTION

A system for measuring a fluid flow rate by processing of acoustic waves is therefore proposed, comprising:
  a receiver of bulk acoustic waves after their propagation in the fluid, designed to supply an electrical signal using the acoustic waves received,
  a first emitter of bulk acoustic waves in the fluid, intended to be arranged upstream of the receiver with respect to the direction of flow of the fluid in such a way as to emit acoustic waves to the receiver,
  a signal processing device designed to determine a flow rate value according to at least one characteristic of the electrical signal supplied,
further comprising:
  a second emitter of bulk acoustic waves in the fluid, different from the receiver and from the first emitter, intended to be arranged downstream of the receiver with respect to the direction of flow of the fluid in such a way as to emit acoustic waves to the receiver, and
  means for synchronizing the first and second emitters with each other in such a way as to generate destructive acoustic interferences between the acoustic waves emitted by the first emitter and those emitted by the second emitter before they are received by the receiver.

As such, by cleverly provoking destructive interferences between acoustic waves propagating in opposite directions with respect to the flow of the fluid, and by supplying a signal resulting from these interferences, pertinent information is obtained on the flow rate of the fluid simply based on the general characteristics of the signal supplied, such as a root mean square (RMS) value, spectral parameters or others of this signal. The variations in the destructive interferences of the acoustic waves received by the receiver depend indeed directly on the variations of the flow rate of the fluid by a phase offset effect induced by the flow rate. They are furthermore sufficiently sensitive to be able to design a compact and precise system wherein the emitters and the receiver can be arranged at a short distance from one another.

Optionally:
  the means for synchronizing are further designed in such a way as to generate constructive acoustic interferences between the acoustic waves emitted by the first emitter and those emitted by the second emitter before they are received by the receiver, and
  the signal processing device is further designed to determine a temperature value according to at least one characteristic of the electrical signal supplied when the latter is the result of these constructive acoustic interferences.

It has indeed been observed that the variations of constructive interferences of the acoustic waves received by the receiver depend directly on variations in the temperature of the fluid, or the temperature of a duct wherein the fluid flows or more generally the temperature of an environment wherein the fluid flows. Pertinent information is as such advantageously obtained on the flow rate of the fluid and this temperature jointly.

Moreover, independently of their use for estimating temperature, the characteristics coming from the electrical signals resulting from constructive acoustic interferences can be used to normalize the characteristics coming from the electrical signals resulting from destructive acoustic interferences.

Also optionally, the means for synchronizing are designed to alternately control:
the simultaneous emitting, by the first and second emitters, of frequency-modulated acoustic waves in phase opposition, intended to generate destructive acoustic interferences between them before they are received by the receiver, and
the simultaneous emitting, by the first and second emitters, of frequency-modulated acoustic waves in phase, intended to generate constructive acoustic interferences between them before they are received by the receiver.

Also optionally, a system for measuring a fluid flow rate according to the invention can further include a monolithic support for coupling the first and second emitters and the receiver to the fluid, the first emitter, the second emitter and the receiver being arranged on waveguides of this monolithic support in such a way as to:
be aligned,
have the same distance between the two emitters, on the one hand, and the receiver, on the other hand, and
emit or receive mainly by refraction acoustic waves to or from the fluid.

Also optionally, the monolithic support has a base formed with the waveguides in such a way as to hug the shape of an external wall of a duct wherein the fluid is intended to flow and wherein at least one bracelet with clamping collar is provided to surround the duct wherein the fluid is intended to flow straight along with each one of the first and second emitters and with the receiver in such a way as to thrust or glue the monolithic support against the external wall of the duct.

Also optionally:
the monolithic support has a lower portion topped by a shoulder formed in such a way as to hug the shape of an external wall of a duct wherein the fluid is intended to flow, said lower portion as such being intended to pass through the wall of the duct in a single through opening of which the perimeter corresponds to that of the lower portion,
each waveguide includes, along its main axis for guiding acoustic waves, a metal rod of which a first end supports one of the emitters or the receiver and of which a second end emerges from the base of the lower portion in such a way as to extend inside the duct wherein the fluid is intended to flow, and
at least one bracelet with clamping collar is provided to surround the duct wherein the fluid is intended to flow straight along with the monolithic support in such a way as to thrust or glue the monolithic support against the external wall of the duct.

Also optionally:
the rods supporting the first and second emitters are of the same length and of the same diameter, and
the rod supporting the receiver has a length greater than that of the rods supporting the first and second emitters, in such a way as to extend further inside the duct wherein the fluid is intended to flow.

Also optionally, the first emitter, the second emitter and the receiver are piezoelectric transducers resonating in thickness.

A method for measuring a fluid flow rate by processing of acoustic waves is also proposed, including:
the emitting of bulk acoustic waves in the fluid, by a first emitter arranged upstream of a receiver with respect to the direction of flow of the fluid in such a way as to emit acoustic waves to the receiver,
the receiving by the receiver, of bulk acoustic waves after their propagation in the fluid and the supplying, by the receiver, of an electrical signal using the acoustic waves received,
the determining, by a signal processing device, of a flow rate value according to at least one characteristic of the electrical signal supplied,
further comprising:
the emitting of bulk acoustic waves in the fluid, by a second emitter different from the receiver, different from the first emitter and arranged downstream of the receiver with respect to the direction of flow of the fluid in such a way as to emit acoustic waves to the receiver, and
a synchronizing of the first and second emitters with each other in such a way as to generate destructive acoustic interferences between the acoustic waves emitted by the first emitter and those emitted by the second emitter before they are received by the receiver.

Optionally, the determining of a flow rate value according to at least one characteristic of the electrical signal supplied comprises the constitution of a signature using said at least one characteristic of the electrical signal supplied and the comparison of this signature with several reference signatures constituted in the same way during a prior phase of learning executed for a plurality of flow rates.

BRIEF DESCRIPTION OF THE DRAWINGS

The invention shall be better understood using the following description, provided solely as an example and made in reference to the annexed drawings wherein.

DESCRIPTION OF THE PREFERRED EMBODIMENTS

Figure 1:
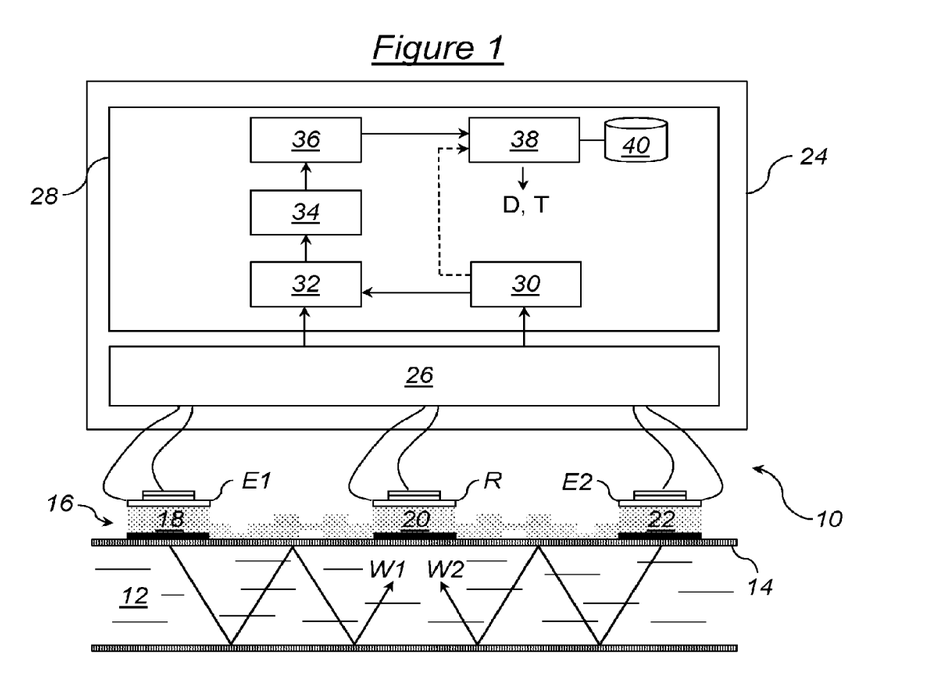
FIG. 1 diagrammatically shows the general structure of a system for measuring a fluid flow rate and optionally a temperature by processing of acoustic waves, according to a first embodiment of the invention.

The system 10 for measuring a flow rate, and optionally a temperature, by processing of acoustic waves shown in FIG. 1 comprises a receiver R of bulk acoustic waves designed to supply an electrical signal using the acoustic waves that it receives. This is a piezoelectric transducer, for example made of ferroelectric ceramic of the LZT (Lead Zirconate Titanate) type, wherein the ceramic is bare or laminated on a brass disk.

It further comprises two separate emitters E1 and E2 of bulk acoustic waves designed to emit these acoustic waves using control electrical signals. These are also piezoelectric transducers, for example of the LZT type. One is intended to be arranged upstream of the receiver R in relation to the direction of flow of a fluid of which it is desired to evaluate the flow rate, in such a way as to emit acoustic waves to the receiver R. The other is intended to be arranged downstream of the receiver R with respect to the direction of flow of the fluid of which it is desired to evaluate the flow rate, in such a way as to also emit acoustic waves to the receiver R.

The piezoelectric transducers E1, E2 and R take for example the form of disks resonating in thickness, of a thickness between 0.1 and 2 mm and of a diameter between 1 and 5 mm. The thickness of the disk defines the working frequency of a transducer when working at a single frequency which is then the resonating frequency in thickness of the disk. For example for a working frequency of 4 MHz, the disk has a thickness of 0.5 mm and a diameter between 3 and 5 mm. The excitation voltages then generally range from about 3V to 200 V peak-to-peak, while the gain in reception ranges from 50 to 100 dB.

In the application shown by way of a non-limiting example in FIG. 1, the fluid 12, liquid or gaseous, of which it is desired to measure the flow rate flows in a cylindrical duct 14 with a circular section, for example according to an arbitrary direction oriented from left to right. In this case, the first emitter E1 arranged to the left of the receiver R is located upstream of the latter according to the direction of flow of the fluid and the second emitter E2 arranged to the right of the receiver R is located downstream of the latter.

The receiver R and the two emitters E1, E2 must be coupled to the fluid 12, in such a way as to emit and receive mainly the aforementioned bulk acoustic waves to and from this fluid 12. In the example of FIG. 1, this coupling is carried out using a calibrated support 16 that is common to the three transducers E1, R, E2 and serving as a template, designed to favor the acoustic coupling with the fluid 12 while still reducing to a maximum the direct acoustic coupling between the emitters E1, E2 and the receiver R. This is obtained by a succession of hollows, possibly passing through the calibrated support 16, and humps within the same support between the different transducers, opposing any direct acoustic propagation between them by acoustically isolating the receiver R from the emitters E1, E2. The calibrated support 16 also comprises guiding elements 18, 20 and 22 whereon are respectively arranged, for example by gluing, the three transducers E1, R and E2. These guiding elements are sintered or cast in the calibrated support 16 in such a way that the latter is monolithic. They can in particular make it possible to adapt flat transducers to the convex shape of the duct 14 against which is arranged the calibrated support 16. They can furthermore themselves be thrust or glued with the base of the calibrated support 16 against the external wall of the duct 14, by means of a silicon seal or a conductive epoxy glue or cyanoacrylate and possibly using one or several bracelet(s) with clamping collar(s) (not shown) surrounding the duct 14 straight along with each transducer, in such a way as to further improve the coupling between the three transducers E1, R, E2 and the fluid 12. For this, the base of the support is advantageously formed in such a way as to hug the shape of the external wall of the duct 14.

The first emitter E1 is more precisely arranged in such a way as to emit acoustic waves W1 propagating by refraction in the fluid 12 and being directed in the direction of flow of the fluid 12 after any reflections against the internal wall of the duct 14 to the receiver R.

Similarly, the second emitter E2 is more precisely arranged in such a way as to emit acoustic waves W2 propagating by refraction in the fluid 12 and being directed in the direction opposite the flow of the fluid 12 after any reflections against the internal wall of the duct 14 to the receiver R.

The acoustic waves W1 and W2 can be emitted in a frequency-modulated sinusoidal or square pulse form in a frequency band between 20 kHz and 10 MHz.

In accordance with the invention, it is desired to be able to generate destructive acoustic interferences between the acoustic waves W1 emitted by the first emitter E1 and those W2 emitted by the second emitter E2 before they are received by the receiver R. To do this, it is advantageous, although not indispensable, to arrange the two emitters E1 and E2 at an equal distance from the receiver R and to ensure the alignment of these three transducers in the direction of the flow of fluid 12. This disposition can be facilitated by the calibrated support 16 of which the symmetry, in particular that of the hollows and of the humps aiming to prevent any direct propagation of acoustic waves between the emitters and the receiver, can be provided and centered on the position of the receiver R. Such a symmetrical structure of the calibrated support 16 furthermore makes it possible to provide the destructive interference of the residual direct propagations when they are emitted in phase opposition. By way of example, the distance between each emitter E1, E2 and the receiver R located in the middle can be between 0.5 and 100 cm, in particular around 25 cm. Note that the greater this distance and the frequency of the acoustic waves emitted are, the greater also the resolution on the measurement of the flow rate of the fluid 12 is. It can also be optionally desired to be able to generate constructive acoustic interferences between the acoustic waves W1 and W2.

The system 10 for measuring further comprises a central electronic control unit 24 designed to:
- make bulk acoustic waves W1, W2 propagate and interfere in the fluid 12 using emitters E1, E2 and have these acoustic waves detected by the receiver R in order to obtain an electrical signal to be processed,
- determine a value D of the flow rate of the fluid 12 according to at least one characteristic of the electrical signal supplied by the receiver R, with this characteristic able to be directly revealing of the flow rate according to a known relationship between a characteristic of the electrical signal supplied and the flow rate or able to be compared with a set of reference characteristics, with these reference characteristics having been learned during a prior phase of learning during which several flow rates are tested, and possibly
- determine an average temperature T of the fluid 12, or an average temperature T of the duct 14 wherein the fluid flows or more generally an average temperature T of the environment wherein the fluid flows according to at least one characteristic of the electrical signal supplied by the receiver R, with this characteristic able to be directly revealing of the temperature according to a known relationship between a characteristic of the electrical signal supplied and the temperature or able to be compared with a set of reference characteristics, with these reference characteristics having been learned during a prior phase of learning during which several temperatures are tested.

More precisely, in the example of FIG. 1, the central electronic control unit 24 comprises:

an emitting/receiving microcontroller 26 of bulk acoustic waves connected electrically to the piezoelectric transducers E1, E2 and R, and a processing module 28 programmed to digitally process the electrical signals supplied by the emitting/receiving microcontroller 26 in order to determine flow rate values.

The emitting/receiving microcontroller 26 is in particular programmed to synchronize the first and second emitters E1, E2 with each other in such a way as to generate destructive acoustic interferences between the acoustic waves that they emit before they are received by the receiver R. Optionally, the emitting/receiving microcontroller 26 is also programmed to synchronize the first and second emitters E1, E2 with each other in such a way as to generate constructive acoustic interferences between the acoustic waves that they emit before they are received by the receiver R. More precisely, the emitting/receiving microcontroller 26 can be programmed to synchronize the first and second emitters E1, E2 between them in such a way that they simultaneously emit frequency-modulated acoustic waves in phase opposition, for destructive interferences, alternating with simultaneous emissions of frequency-modulated acoustic waves in phase, for constructive interferences. It includes for this an arithmetic logic unit that makes it possible to generate signals for controlling synchronized emissions of these acoustic waves.

The emitting/receiving microcontroller 26 is furthermore provided with a digital-to-analog converter of which the output is connected, if necessary via amplifiers, to the emitters E1 and E2. Moreover, the receiver R is connected to an amplifier and to an analog-to-digital converter which are themselves part of the emitting/receiving microcontroller 26. The analog-to-digital converter is able to carry out a sampling of the signals supplied by the receiver R, for example over 12 bits. The amplifier is able to preamplify the analog electrical signals received in such a way that they occupy half of the full analog-to-digital conversion scale of the converter. In light of the different dynamics between the emission in phase and those in phase opposition, the gain applied to the electrical signals resulting from emissions in phase opposition is highly greater, ten to one hundred times for example, than the gain applied to the electrical signals resulting from emissions in phase. The amplification is moreover advantageously filtering, being applied mainly within the limit of the frequency band of the acoustic emissions, in such a way as to optimize the signal-to-noise ratio of the electrical signals to be processed by the module 28.

The emitting/receiving microcontroller 26 is programmed to operate in the following way. At the same time that the pulse acoustic signals W1 and W2 are issued simultaneously in phase or in phase opposition, the acquisition of the receive electrical signal noted as R(t) supplied by the receiver R is started. This analog signal is sampled synchronously or asynchronously. In the latter case, the width of the temporal acquisition window is greater than or equal to the duration of the excitation pulses W1, W2 and the analog-to-digital conversion begins at the time of the emissions in such a way that the electrical signal R(t) is also comprised of a pulse contained in a temporal window filled with zeroes before and after the period of emission. A temporal acquisition window is as such obtained that has a frequency resolution by Fourier transform that is greater than the temporal window of the emissions. In addition, the period of repetition of the flow rate measurements is advantageously greater than or equal to the temporal acquisition window. In practice it can even be clearly greater. For example, in light of the fact that it can be desired to limit the electrical energy consumption of the system 10 for measuring, the measurement rate can be of a magnitude of one measurement per minute to one measurement per hour, while the temporal acquisition window can be of a magnitude of the millisecond to the second. Moreover, the sampling frequency of the electrical signal R(t) must be at least equal to double the maximum frequency of the excitation signals. As such, if the emitting/receiving microcontroller 26 has an analog-to-digital converter with a sampling frequency of 12 MHz, the upper frequency of the excitation signals can range up to 5 MHz without any risk of spectrum overlapping.

The electrical connections between the emitting/receiving microcontroller 26 and the transducers E1, E2 and R can be constituted in particular of coaxial cables of the audio type or of any other shielded connection. This condition is stronger for the receiver R of which the small disturbances are noted than for the two emitters E1 and E2.

The emitting/receiving microcontroller 26 is moreover connected to the processing module 28 by a data transmission bus for the supplying of the successive digitized electrical signals R(t).

Any digitized electrical signal $R_N(t)$ coming from an N-th emission of acoustic waves W1, W2 in phase generating a constructive interference is transmitted to a first calculator 30 of the processing module 28. The function of this calculator 30 is to estimate the coupling efficiency of the emitters E1, E2 with the duct 14 and the input-output acoustic insertion output of the waves through the wall of the duct 14. It has indeed been observed that the constructive interference of the acoustic waves makes it possible to characterize the quality of the coupling of the emitters E1, E2 with the duct 14 and the input-output acoustic insertion output which depends on the ambient temperature and is therefore able to vary very substantially over time. For example, according to whether it is winter or summer, day or night, or according to which the duct 14 transports a hot or cold fluid, the elasticity and the volume of the material wherein the duct 14 is constituted can vary substantially in such a way that the coupling and the propagation velocity of the waves can vary significantly with the temperature. As such, at a given frequency and for the same flow rate, the phase shift between waves varies with the temperature and the RMS value of the reception signal also. In order to make its estimate, the calculator 30 supplies a RMS value of the digitized signal received noted specifically as $R_N[E1+E2](t)$. This RMS value is noted as $\text{Eff}(R_N[E1+E2])$. By definition, it represents the square root of the average of the signal $R_N[E1+E2](t)$ squared over an interval of time corresponding to the temporal acquisition window. For a given duct of a known diameter and material, this RMS value can be considered as representative of an average temperature of the duct and the variation of this RMS value can be considered as representative of a variation of the average temperature of the duct which can be used advantageously after establishing a correspondence between RMS values and temperatures in order to supply an estimate of the average temperature together with a flow rate estimate.

Note that it is also advantageous to balance the amplitudes of the signals emitted by the emitters E1 and E2 so that they individually produce the same RMS amplitude at the terminals of R regardless of the flow rate. The balancing is however carried out after the operation of calculating the RMS value Eff($R_N$[E1+E2]) in order to access an input-output acoustic insertion output that really accounts for the temperature.

Any digitized electrical signal $R_N(t)$ coming from an N-th emission of acoustic waves W1, W2 in phase opposition generating a destructive interference is transmitted to a second calculator 32 of the processing module 28. The function of this calculator 32 is to normalize the signal that it receives, noted specifically as $R_N$[E1−E2](t), according to the last result supplied by the calculator 30. It therefore performs the calculation $R_N$[E1−E2](t)/Eff($R_N$[E1+E2]), which renders in particular the signal that it supplies at the output independent of the variations in ambient temperature, with the condition that the amplitudes of the signals emitted by the emitters E1 and E2 have indeed been balanced beforehand. Note this signal as $R'_N(t)$.

The processing module 28 further comprises a time/frequency converter 34 that receives the normalized signal $R'_N(t)$ in order to supply the frequency spectrum of it. Concretely, this frequency spectrum can be estimated simply by an FFT ("Fast Fourier Transform") calculation supplying the spectrum FFT($R'_N(t)$). Considering that the acoustic pulses emitted by the emitters E1, E2 have spectra included in a frequency band between a minimum frequency Fmin and a maximum frequency Fmax, by possibly taking care to eliminate certain frequency components due to other environmental factors that the propagations in the fluid 12 of acoustic waves emitted by the emitters E1, E2, a vector value FFT($R'_N(t)$) is obtained with P frequency components between Fmin and Fmax. By way of example, Fmin=20 kHz, Fmax=100 kHz and P=800 for a frequency step of 100 Hz. More generally, P is advantageously greater than or equal to 1, in a frequency band included within the limits [20 kHz; 10 MHz].

The processing module 28 further comprises an extractor 36 of at least one characteristic of the spectrum FFT($R'_N(t)$) obtained from the digitized electrical signal $R_N(t)$. In an advantageous embodiment, several different characteristics are extracted.

These characteristics comprise for example a RMS value of the signal $R'_N(t)$ or equivalent, called the signal strength. In accordance with Parseval's identity applied to a finite energy pulse signal, the calculation of the energy in the time domain is equal to the calculation of the energy in the frequency domain. In this way, the signal strength $R'_N(t)$, corresponding to its RMS value in the temporal acquisition window and noted as Eff($R'_N$), can be obtained in the frequency domain using the spectrum FFT($R'_N(t)$) in the following way:

$$\text{Eff}(R'_N) = \text{Norm}|FFT(R'_N(t))|,$$

where Norm is the Euclidean norm and | | a modulus calculation, with FFT($R'_N(t)$) being a complex value.

Performing the calculations in the frequency domain has the interest of overcoming the continuous component coming from the offset voltage of any amplifier that can easily be filtered as well as eliminating certain frequencies that are not representative of the acoustic signal but which can be attributed to some electronic processing components such as switch-mode power supplies. Furthermore, working in the frequency domain makes it possible to overcome synchronization constraints of the pulse signal supplied by the receiver R which can be digitized with a certain delay that represents a temporal translation and therefore a simple phase effect is the space of frequencies.

The extracted characteristics comprise for example also a vector value of the disturbance of the flow of fluid 12 in relation to a reference situation, expressed in the following form:

$$RD(N) = \frac{|FFT(R'_N(t))| - |FFT(R'_0(t))|}{|FFT(R'_0(t))|}.$$

This disturbance comprises P vector components, one per frequency value in the frequency band observed. The reference situation, represented by the measurement of $R'_0(t)$ in phase opposition, corresponds for example to an initial situation of zero or minimal flow rate at a predetermined moment (for example at three o'clock in the morning).

A RMS scalar value of disturbance RMSD(N) can then be calculated using the disturbance RD(N), according to the following calculation:

$$RMSD(N) = \frac{1}{\sqrt{P}} Norm(RD(N)).$$

The extracted characteristics also comprise for example a scalar value of residual noise representing a change between two successive measurements, assumed to be imputable in particular to the quantization noise, in a situation wherein it is supposed that for two very close successive measurements wherein the waves are emitted in phase opposition, the conditions of flow have not changed and the receiver R should therefore supply the same result. This is a heavy going hypothesis but often verified statistically. The residual noise can be expressed in the following way:

$$BR(N) = \frac{1}{P} \sum_{k=1}^{P} \left| \frac{|FFT(R'_N(t))_k| - |FFT(R'_{N-1}(t))_k|}{|FFT(R'_{N-1}(t))_k|} \right|,$$

Where the index k indicates the k-th frequency component of a considered vector.

A percentage value RDR(N) quantizing the disturbance RD(N) in relation to the residual noise BR(N) can then be defined in the following way:

$$RDR(N) = \left| \frac{\sum_{k=1}^{P} |RD(N)_k|}{BR(N)} - 1 \right| \cdot 100.$$

This percentage value RDR(N) makes it possible for example to determine if the N-th measurement can be used or not, as the disturbance RD(N) or its RMS value RMSD(N) has to be sufficiently large before the residual noise RD(N) in order to be considered as relevant.

The processing module 28 further comprises an estimator 38 of flow rate D according to at least part of the aforementioned extracted characteristics and possibly corresponding reference characteristics recorded in a memory zone 40 to which the estimator 38 has read access. These reference characteristics are relative to different flow rates learned beforehand. In order to render these learnings independent of the temperature, they should be normalized by an initial RMS value $Eff(R_0[E1+E2])$ which can be obtained using the calculator 30. Alternatively, if the reference characteristics are not normalized by the factor $Eff(R_0[E1+E2])$, this factor should be taken into account during the normalization calculation performed by the calculator 32:

$$R'_N(t) = R_N[E1-E2](t) \cdot \frac{Eff(R_0[E1+E2])}{Eff(R_N[E1+E2])}.$$

As such, using a known relation between at least one of the extracted characteristics and different values of flow rates or using a comparison between at least part of the extracted characteristics, called a signature, and a set of reference signatures with each one corresponding to a flow rate value, it is possible to deduce a flow rate value D for each measurement taken in phase opposition. The percentage value RDR(N) makes it possible moreover to weight the relevance of the corresponding measurement, in particular for the characterization of the lowest flow rates that make it possible to detect leaks.

Optionally, the estimator 38 of flow rate D also fulfills a function of estimating the average temperature T using the RMS value $Eff(R_N[E1+E2])$ supplied by the calculator 30 and possibly corresponding RMS reference values recorded in the memory zone 40. These RMS reference values are relative to different temperatures learned beforehand. The average temperature T can also be estimated using a known relation between the RMS value $Eff(R_N[E1+E2])$ and different known temperature values.

Note that if the system 10 comprises a central electronic control unit 24 remote from the emitting/receiving transducers E1, E2 and R, with the system 10 even able to comprise several sets of emitting/receiving transducers E1, E2 and R distributed at several different locations of the duct 14 for the same central electronic control unit 24, it comprises in a known manner per se means for transmitting measurements carried out by the receiver or receivers R to the remote central electronic control unit 24. These means can be of the radio or acoustic technology and designed for a transmission from one to the next from a set of transducers to the other or directly from each set to the central unit.

Figure 2:
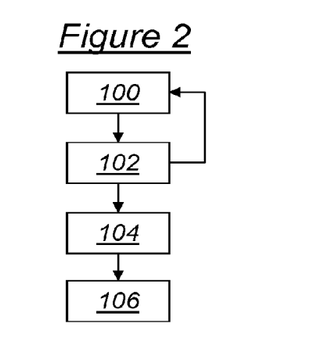
FIG. 2 shows the successive steps of a method for measuring a fluid flow rate and optionally a temperature, implemented by the system of FIG. 1.

A method for measuring a fluid flow rate and optionally a temperature by processing of acoustic waves implemented by the system 10 described hereinabove shall now be detailed in reference to FIG. 2. It executes in a context of monitoring of the fluid flow rate alternating idle phases and measurement phases with recognition, archival and/or transmission of the data collected.

In measuring phase, during a step 100, bulk acoustic waves are emitted in a synchronized manner, in phase or in phase opposition, in the fluid 12 flowing inside the duct 14, by the emitters E1 and E2 as controlled by the emitting/receiving microcontroller 26.

During a step 102, the acoustic waves emitted are received by the receiver R after having propagated in the fluid 12 and having interfered between them. The emitting/receiving microcontroller 26 processes the analog signal returned by the receiver R in order to supply a digitized electrical signal to the processing module 28.

The steps 100 and 102 are repeated in successive loops of measurements during which the emissions are for example alternately in phase and in phase opposition in order to respectively generate constructive interferences, intended to be processed by the calculator 30, and destructive interferences, intended to be processed by the calculator 32.

During a step 104, upon execution of the calculators 30 and 32, as well as the time-frequency converter 34 and the extractor 36 during an N-th measurement, the RMS value $Eff(R_N[E1-FE2])$ as well as the aforementioned characteristics $Eff(R'_N)$, RD(N), RMSD(N), BR(N) and/or RDR(N) are extracted from the measurements and transmitted to the estimator 38 of flow rate D and of temperature T.

Finally, during a step 106 of determining the temperature and flow rate, the estimator 38 determines a temperature value T and a flow rate value D according respectively to the RMS value $Eff(R_N[E1+E2])$ and to the characteristics that it was supplied with.

In a particularly simple alternative embodiment, only the RMS values $Eff(R_N[E1+E2])$ and $Eff(R'_N)$ can be calculated and transmitted to the estimator 38. Indeed, subject to a good relative disposition of the emitters E1, E2 and of the receiver R (i.e. aligned transducers and receivers E1, E2 equidistant from the receiver R, good direct acoustic insulation), also subject to the amplitudes of the signals emitted by the emitters E1 and E2 have indeed been balanced beforehand, the reference situation, represented by the measurement of $R'_0(t)$ in phase opposition, corresponding for example to an initial situation of zero or minimal flow rate during a predetermined duration of observation, can produce a measurement of $R'_0(t)$ in phase opposition such that the corresponding RMS value $Eff(R'_0)$ is zero or practically zero and such that any increase in the flow rate involves a corresponding increase in the value $Eff(R'_N)$ according to a simple predetermined and even linear relation. This is due to the fact that any increase in the flow rate moves away the destructive interferences of the situation of initial phase opposition through the effect of a transit time difference between the upstream-downstream direction and the downstream-upstream direction, and therefore by a phase offset effect, linearly inducing an increase in the RMS value of the resulting signal. In this case, determining the flow rate during the step 106 can be carried out simply, without comparing signatures, by application of a bijective relation known beforehand between the possible values of $Eff(R'_N)$ and those of the flow rate over a considered range of values of interest. The determining of the temperature during the step 106 can also be done simply, without comparing with RMS reference values, by application of a bijective relation known beforehand between the possible values of $Eff(R_N[E1+E2])$ and those of the temperature over a considered range of values of interest.

Furthermore, given that the RMS values of electrical signals can be obtained with analog technology, it is even possible in this case to dispense with means for digitizing signals and digital means of processing in such a way that the emitting/receiving microcontroller 26 and the processing module 28 of the central electronic control unit 24 could be reduced to their simplest expression by using only analog electronic components.

In a more complex but better performing alternative embodiment, the various aforementioned characteristics can be calculated and transmitted to the estimator 38. In this case, for a given N-th measurement, these characteristics can be freely combined between them according to several possible acceptable choices that can be adapted based on the contexts of application in order to form a signature to be compared with reference characteristics, which themselves are combined together in the same way so as to form reference signatures, learned beforehand for a plurality of flow rates and recorded in the memory zone 40.

In this case, a predefined distance or cost function to be optimized during the step 106 makes it possible to select from among the reference signatures that which is closest to the signature corresponding to the measurement in progress and to deduce therefrom the corresponding flow rate.

By way of a non-limiting example, it is possible in the step 106 for the estimator 38, in light of the calculated characteristics $\text{Eff}(R'_N)$, $RD(N)$, $RMSD(N)$, $BR(N)$ and $RDR(N)$, to proceed in the following way:

a) selecting in the memory zone 40 of a restricted set of reference signatures associated with RMS values located in a predetermined vicinity of the current RMS value $\text{Eff}(R'_N)$, with these RMS values moreover able to be representative of a rather roughly quantifiable flow rate as a first approximation, as well as of an average temperature of the duct 12 corresponding to the RMS value $\text{Eff}(R_N[E1+E2])$, b) calculating distances between the current vector value of disturbance $RD(N)$ and each one of the vector values of reference disturbance of the selected restricted set, c) calculation of the ratio between the average of the distances calculated beforehand and the smallest of these distances, with this ratio defining a contrast ratio of the calculated distances, d) if the ratio calculated hereinabove is greater than a predetermined threshold, for example 150%, selecting of the flow rate value associated with the smallest of the distances calculated hereinabove as the value of estimation and output of the method, e) if the ratio calculated hereinabove is less than the predetermined threshold, enlarging of the vicinity around the current RMS value $\text{Eff}(R'_N)$ and return to step a), f) reporting of anomaly information if, despite a search of minimum distance involving all of the reference signatures, the ratio hereinabove remains less than the predetermined threshold.

In the case of this more complex embodiment involving comparisons of signatures, a learning phase is required in order to supply the memory zone 40 with reference signatures. It shall now be detailed in reference to FIG. 3.

Figure 3:
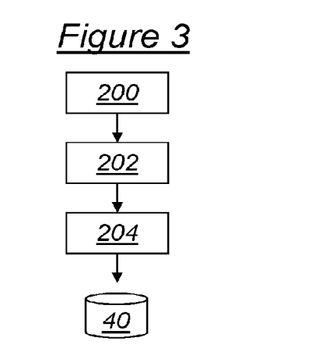
FIG. 3 shows the successive steps of a phase of learning for the implementation of an alternative embodiment of the method for measuring of FIG. 2, FIG. 4 diagrammatically shows a portion of the general structure of a system for measuring a fluid flow rate and optionally a temperature by processing of acoustic waves, according to a second embodiment of the invention.

During a first step 200 corresponding to the execution of one or several measurement loops in accordance with the steps 100 and 102, electrical signals are taken by the receiver R while a flow rate of the fluid 12 in the duct 14 is known in advance and a temperature is also possibly known in advance.

During a step 202 executed for each measurement loop, upon execution of the calculators 30 and 32, as well as of the time/frequency converter 34 and of the extractor 36, the reference characteristics $\text{Eff}(R'_0)$, $RD(0)$, $RMSD(0)$, $BR(0)$ and/or $RDR(0)$ are extracted from the measurements and combined together, according to the choice of those skilled in the art, in order to form a reference signature. This reference signature is advantageously normalized as detailed hereinabove in order to make it independent of the surrounding conditions such as the temperature, while still reporting an average temperature value of the duct. The reference RMS value $\text{Eff}(R_0[E1+E2])$ can also be extracted from the measurements.

Finally, during a step 204, a final reference signature, possibly obtained by a calculation of the average of several reference signatures coming from several measurement loops, is recorded in the memory zone 40 in relation with the flow rate and the temperature known in advance. In the same way, a RMS final reference value for the constructive interferences can be obtained and recorded independently in the memory zone 40 in relation with the temperature known in advance.

Note that the phase of learning can be carried out based on as many flow rates as desired according to the application considered, for example over a range of flow velocities ranging from 0.001 m/s to more than 10 m/s and with a measurement pitch that is not necessarily constant, but dependent on the application considered. For example, in the case where it is sought to detect leaks, the phase of learning can supply a database of flow rates covering 1,000 to 10,000 different flow rates, but with a high resolution on the measurement of low flow rates and a resolution that is not as high and constant over the upper portion of the target range of flow rates. The same applies for the fluctuation of the signal $\text{Eff}(R_N[E1+E2])$ according to the average temperature of the duct 12 wherein the waves propagate.

Also note that the phase of learning can be carried out for ducts and fluids of different types of which the characteristics (material, diameter, etc.) are not necessarily known, for example a duct of unknown diameter made of plastic such as polyvinyl chloride, cement, metal or other, a fluid such as water, gasoline, diesel, oil, emulsion or other. A database as rich as desired can as such be compiled, with the phase of learning being independent of the aforementioned materials and characteristics.

Figure 4:
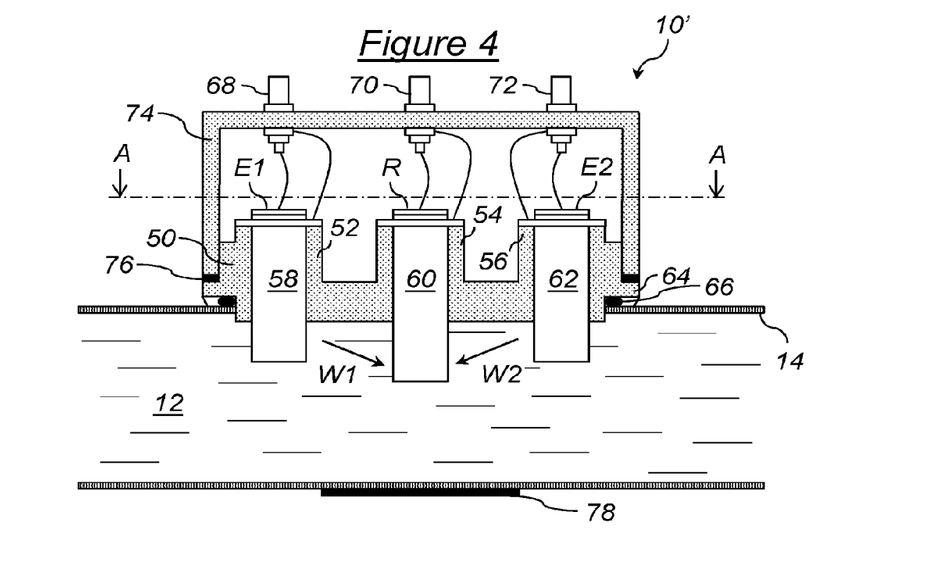

FIG. 4 diagrammatically and partially shows a system 10' for measuring a flow rate by processing of acoustic waves, according to another possible embodiment of the invention. This system 10' can comprise the same central electronic control unit 24 as the system 10 in such a way that it is not shown again.

The system 10' is primarily distinguished from the system 10 by the manner in which the emitting/receiving transducers E1, E2 and R, identical to those of the first embodiment, are coupled to the duct 14, for an optimum transmission of the acoustic waves W1 and W2 in the fluid 12.

The coupling is carried out using a monolithic support 50 that is common to the three transducers E1, R, E2 and serving as a template, designed as the support 16 described hereinabove in order to favor the acoustic coupling with the fluid 12 while still reducing to a maximum the direct acoustic coupling between the emitters E1, E2 and the receiver R.

This monolithic support 50 is for example carried out by injection or sintering of powder made of plastic material (Polyamide, PVC, ABS or other) and has a lower portion of which the perimeter, for example circular of a diameter between 10 and 30 mm when the duct 14 is of a diameter close to 100 mm, corresponds to that of a corresponding single through opening drilled in the wall of the duct 14. It is as such inserted into the duct 14 in such a way that the base of its lower portion is flush inside the duct with the same radius of curvature.

It further comprises, formed in the same material as the lower portion, three waveguides 52, 54, 56 drilled along their main waveguide axis in order to receive by insertion by force, or with gluing, or with a screw pitch, three cylindrical rods 58, 60, 62 made of metal, typically of aluminum, stainless steel, biocompatable titanium, copper or brass. The three cylindrical rods 58, 60, 62 are truncated and flat at their ends in particular in order to receive on their upper end outside of the duct 14 respectively the emitter E1, the receiver R and the emitter E2. They have a diameter between 1 and 5 mm, preferably 3 mm, and a length ranging from 1 to 150 mm, preferably 25 mm. The two rods 58 and 62 supporting the two emitters E1 and E2 are more preferably of the same diameter and same length. The central rod 60 supporting the receiver R can have a length somewhat greater by a few millimeters knowing that the angle of refraction of the acoustic waves W1 and W2 from the emitting rods 58, 62 towards the central rod 60 in the fluid 12 is slanted, for example in the neighborhood of 14° in relation to the normal to the main axis of each rod for almost longitudinal acoustic waves radiating from an aluminum rod in water.

The three guides 52, 54, 56 are configured so that the three transducers are aligned, the emitter R in the middle and at an equal distance, between 1 and 25 mm, preferably around 10 mm, from the two emitters E1, E2.

The lower end of each cylindrical rod 58, 60 or 62 emerges from the base of the lower portion of the support 50 inside the duct 14, for example of a depth between 0.5 and 10 wavelengths for the two emitting rods, i.e. 0.75 mm to 15 mm for an operation at 4 MHz in aluminum.

The flushing of the base of the lower portion of the monolithic support 50, by default zero, can extend even so over a slight depth in order to bring the rods farther to the core of the duct 14.

The monolithic support 50 furthermore has a shoulder 64 above its lower portion intended to be thrust against the external wall of the duct 14 and formed for this according to the same radius of curvature. An annular seal 66 surrounding the lower portion of the monolithic support 50 under the shoulder provides the seal for the whole.

The monolithic support 50 has a thickness as low as possible in order to limit direct coupling between the emitting rods 58, 62 and the receiving rod 60, but at least equal to the thickness of the wall of the duct 14. It is chosen over a range of values ranging from 1 to 10 mm, preferably 5 mm, with the three guides emerging from an additional thickness of 5 mm, in such a way that the three cylindrical rods are maintained over a length of 10 mm, sufficient to contain the pressure in the duct.

The three transducers E1, R, E2 are for example arranged on the three cylindrical rods 58, 60, 62 by gluing by means of a conductive epoxy glue or of a thin glue of the cyano-acrylate type of by metal brazing for example on brass rods. They are connected to the central electronic control unit 24 by cords connected to coaxial connectors 68, 70, 72 screwed onto a base 74. The base 74 furthermore plays the role of a protective cap for the monolithic support 50, its three guides 52, 54, 56, the three cylindrical rods 58, 60, 62 and the three transducers E1, R, E2. The base 74 is sealed and snapped in, glued or crimped to the monolithic support 50.

Figure 5:
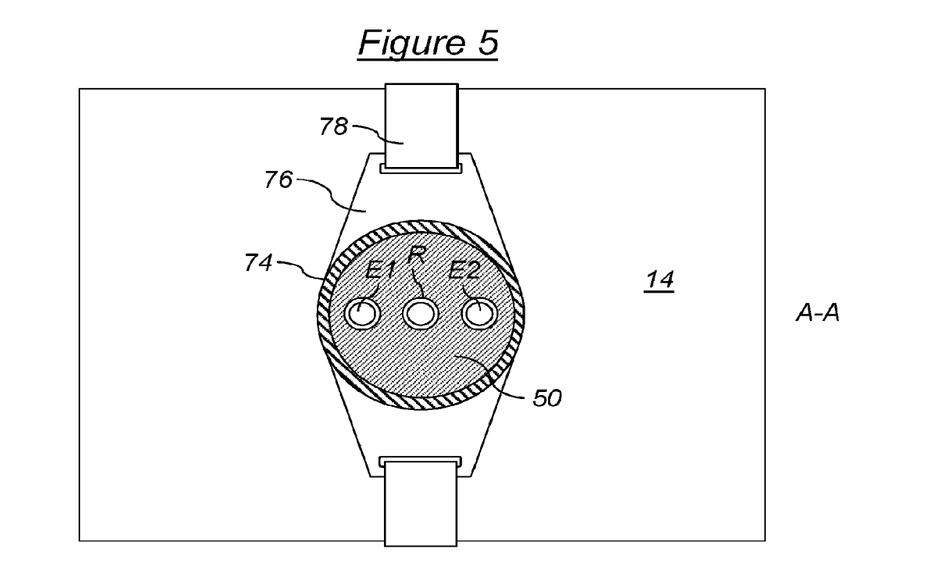
FIG. 5 is a view according to a cross-section A-A of the system of FIG. 4.

Furthermore, a bracelet 76 with clamping collar 78 is wedged between the base 74 and the monolithic support 50. It is clearly visible in position mounted around the duct 14 in FIG. 5 which shows the whole as a top view on another scale, according to a cross-section A-A indicated in FIG. 4.

This embodiment has several advantages in relation to the preceding. It is first of all more compact, with the transducers being closer on the support 50. Furthermore, by passing through the wall of the duct 14, the coupling no longer depends on the material of this wall and is as such optimized. Finally, a single hole is formed in the duct 14 for the passing of the three cylindrical emitting/receiving rods of the acoustic waves.

It appears clearly that a system for measuring a fluid flow rate by processing of acoustic waves such as one of those described hereinabove makes it possible to estimate this flow rate simply and effectively. It also makes it possible optionally to simply and effectively estimate an average local temperature.

In the case of an implementation with phase of learning, it is not even necessary to have information on the nature of the fluid or on the characteristics of a duct wherein it circulates in order to report the value of the flow rate or of the temperature. Moreover, by varying the quality of the learning the quality of the estimating is directly varied in the local average temperature and flow rate measurement phase.

It is furthermore possible thanks to such a system to detect leaks, for example by setting acceptable thresholds of disturbance in the flow rate, simultaneously in several locations of a fluid distribution network.

Moreover, the configuration of the two previously described embodiments, by external thrusting of the emitting/receiving transducers against a duct or by drilling of a compact structure in a single location of the duct, simplifies the operations of mechanical installation of the system. They can be rapid and robust.

Finally, the respective disposition of the two emitters and of the receiver allows for a confinement of the measurement in a portion of duct that is clearly limited by the two emitters.

Note moreover that the invention is not limited to the embodiments described hereinabove.

Alternatively, the receiver R is for example a piezoelectric transducer formed from a ceramic disk of which the upper electrode is divided into two half-disks. The electrical signal supplied by this receiver R is then constructed using a differential measurement on the two half-disks. In this particular configuration, the emitters E1 and E2 must issue acoustic waves in phase so that there is destructive interference on receiver R. This configuration is practical when it is desired to excite the two emitters by the same output stage of a control electronics and limit the number of components. But of course, in this case, no balancing is possible between the two emitting channels.

It will appear more generally to those skilled in the art that various modifications can be made to the embodiments hereinabove, in light of the teaching that has just been disclosed. In the following claims, the terms used must not be interpreted as limiting the claims to the embodiments disclosed in this description, but must be interpreted so as to include therein all of the equivalents that the claims aim to cover due to their formulation and of which the foreseeing is within the scope of those skilled in the art by applying their general knowledge in implementing the teaching that has just been disclosed.

The invention claimed is:

1. A system for measuring a flow rate of fluid by processing of acoustic waves, including:
   a receiver of bulk acoustic waves after their propagation in the fluid, designed to supply an electrical signal using the acoustic waves received;
   a first emitter of bulk acoustic waves in the fluid, configured to be arranged upstream of the receiver with respect to the direction of flow of the fluid in such a way as to emit acoustic waves to the receiver;
   a second emitter of bulk acoustic waves in the fluid, different from the receiver and from the first emitter, configured to be arranged downstream of the receiver with respect to the direction of flow of the fluid in such a way as to emit acoustic waves to the receiver; and
   processing circuitry configured to
   synchronize the first and second emitters with each other so as to simultaneously emit frequency-modulated acoustic waves;
   determine a flow rate value according to at least one characteristic of the electrical signal supplied, and generate destructive acoustic interferences between the acoustic waves emitted by the first emitter and those emitted by the second emitter, wherein the first and second emitters generate the destructive acoustic interferences by simultaneously emitting the frequency-modulated acoustic waves with a predetermined phase relationship such that the destructive acoustic interferences are generated between the first and second emitters before they are received by the receiver.

2. The system for measuring a flow rate of fluid according to claim 1, wherein:

the processing circuitry is further configured to generate constructive acoustic interferences between the acoustic waves emitted by the first emitter and those emitted by the second emitter before the acoustic waves emitted by the first emitter and the second emitter are received by the receiver, by simultaneously emitting the frequency-modulated acoustic waves with a predetermined phase relationship such that the constructive acoustic interferences are generated between the first and second emitters before they are received by the receiver; and determine a temperature value according to a known relationship between temperature and at least one characteristic of the electrical signal supplied when the latter is the result of these constructive acoustic interferences, and a measured value of said at least one characteristic of the electrical signal supplied when the latter is the result of these constructive acoustic interferences.

3. The system for measuring a flow rate of fluid according to claim 2, wherein the processing circuitry is configured to alternately control:

the simultaneous emitting, by the first and second emitters, of the frequency-modulated acoustic waves to be in phase opposition to generate the destructive acoustic interferences; and the simultaneous emitting, by the first and second emitters, of frequency-modulated acoustic waves in phase to generate the constructive acoustic interferences.

4. The system for measuring a flow rate of fluid according to claim 1, further including a monolithic support for coupling the first and second emitters and the receiver to the fluid; the first emitter, the second emitter and the receiver being arranged on waveguides of this monolithic support in such a way as to:

be aligned;

have the same distance between the two emitters, on the one hand, and the receiver, on the other hand; and emit or receive by refraction acoustic waves to or from the fluid.

5. The system for measuring a flow rate of fluid according to claim 4, wherein the monolithic support has a base formed with the waveguides in such a way as to hug the shape of an external wall of a duct wherein the fluid is configured to flow and wherein at least one bracelet with clamping collar is provided to surround the duct wherein the fluid is configured to flow straight along with each one of the first and second emitters and with the receiver in such a way as to thrust or glue the monolithic support against the external wall of the duct.

6. The system for measuring a flow rate of fluid according to claim 4, wherein:

the monolithic support has a lower portion topped by a shoulder formed in such a way as to hug the shape of an external wall of a duct wherein the fluid is configured to flow, said lower portion as such being configured to pass through the external wall of the duct in a single through opening of which the perimeter corresponds to that of the lower portion;

each waveguide includes, along its main axis for guiding acoustic waves, a metal rod of which a first end supports one of the emitters or the receiver and of which a second end emerges from a base of the lower portion in such a way as to extend inside the duct wherein the fluid is configured to flow; and at least one bracelet with clamping collar is provided to surround the duct wherein the fluid is configured to flow straight along with the monolithic support in such a way as to thrust or glue the monolithic support against the external wall of the duct.

7. The system for measuring a flow rate of fluid according to claim 6, wherein:

the rods supporting the first and second emitters are of the same length and of the same diameter; and the rod supporting the receiver has a length greater than that of the rods supporting the first and second emitters, in such a way as to extend further inside the duct wherein the fluid is configured to flow.

8. The system for measuring a flow rate of fluid according to claim 1, wherein the first emitter, the second emitter and the receiver are piezoelectric transducers resonating in thickness.

9. A method for measuring a flow rate by processing of acoustic waves, including:

emitting of bulk acoustic waves in the fluid, by a first emitter arranged upstream of a receiver with respect to the direction of flow of the fluid in such a way as to emit acoustic waves to the receiver;

emitting of bulk acoustic waves in the fluid, by a second emitter different from the receiver, different from the first emitter and arranged downstream of the receiver with respect to the direction of flow of the fluid in such a way as to emit acoustic waves to the receiver;

a synchronizing of the first and second emitters with each other so as to simultaneously emit frequency-modulated acoustic waves;

receiving, by the receiver, of bulk acoustic waves after their propagation in the fluid and the supplying, by the receiver, of an electrical signal using the acoustic waves received; and determining, by a signal processing device, of a flow rate value according to at least one characteristic of the electrical signal supplied, wherein the synchronizing is performed in such a way as to generate destructive acoustic interferences between the acoustic waves emitted by the first emitter and those emitted by the second emitter, wherein the first and second emitters generate the destructive acoustic interferences by simultaneously emitting the frequency-modulated acoustic waves with a predetermined phase relationship such that the destructive acoustic interferences are generated between the first and second emitters before they are received by the receiver.

10. The method for measuring a flow rate according to claim 9, wherein the determining of a flow rate value according to at least one characteristic of the electrical signal supplied comprises the constitution of a signature using said at least one characteristic of the electrical signal supplied and the comparison of this signature with several reference signatures constituted in the same way during a prior phase of learning executed for a plurality of flow rates.

\* \* \* \* \*